(12) United States Patent
Bateman et al.

(10) Patent No.: US 6,246,497 B1
(45) Date of Patent: Jun. 12, 2001

(54) ACTIVE OPTICAL LOOP-BACK SYSTEM

(75) Inventors: R. James Bateman, New Milford, CT (US); Bert A. Lindgren, Decatur, GA (US)

(73) Assignee: Net-Hopper Systems, Inc., Atlanta, GA (US)

( * ) Notice: Subject to any disclaimer, the term of this patent is extended or adjusted under 35 U.S.C. 154(b) by 0 days.

(21) Appl. No.: 09/041,403

(22) Filed: Mar. 12, 1998

(51) Int. Cl.$^7$ ................................................ H04B 10/08
(52) U.S. Cl. ...................... 359/110; 359/166; 359/176; 359/177
(58) Field of Search ................................ 359/110, 166, 359/176, 177

(56) References Cited

U.S. PATENT DOCUMENTS

| | | | |
|---|---|---|---|
| 4,313,224 | * 1/1982 | Wakabayashi et al. | 455/601 |
| 4,534,064 | 8/1985 | Giacometti et al. | 455/601 |
| 4,829,512 | 5/1989 | Nakai et al. | 370/16 |
| 5,274,496 | * 12/1993 | Fujiwara et al. | 359/177 |
| 5,282,074 | * 1/1994 | Miyazaki et al. | 359/174 |
| 5,296,957 | * 3/1994 | Takahashi et al. | 359/177 |
| 5,301,050 | 4/1994 | Czerwiec et al. | 395/110 |
| 5,319,482 | 6/1994 | Tsuchiya et al. | 359/110 |
| 5,335,104 | 8/1994 | Johnson | 359/110 |
| 5,381,257 | * 1/1995 | Ferrar | 359/156 |
| 5,528,404 | 6/1996 | MacKichan | 359/110 |
| 5,539,558 | 7/1996 | Yonemura et al. | 359/110 |
| 5,557,437 | 9/1996 | Sakai et al. | 359/110 |
| 5,615,034 | * 3/1997 | Hori | 359/110 |
| 5,677,781 | * 10/1997 | Mori et al. | 359/179 |
| 6,023,359 | * 2/2000 | Asahi | 359/119 |

\* cited by examiner

*Primary Examiner*—Leslie Pascal
*Assistant Examiner*—Vu Lieu
(74) *Attorney, Agent, or Firm*—Needle & Rosenberg, P.C.

(57) ABSTRACT

An apparatus for looping-back an optical signal in an optical communications system includes a transmitting station and a receiving station optically coupled to the transmitting station by a transmission fiber and reception fiber. Data is transmitted from the transmitting station to the receiving station through the transmission fiber and is also transmitted from the receiving station to the transmitting station through the reception fiber. The apparatus includes a beam splitter having an input port, an output port and a tap port, operationally coupled to the transmission line. The beam splitter is capable of diverting a preselected beam portion of an optical data beam being transmitted through the transmission fiber to the tap port. A tap fiber that is operationally coupled to the tap port allows the preselected beam portion to propagate therethrough. An optical analyzer, optically coupled to the tap fiber, regenerates the preselected portion, thereby creating a return beam. A return fiber, optically coupled to the optical analyzer, transmits the return beam. An optical switch, optically coupled the to reception fiber and to the return fiber, selectively optically couples the return fiber to the transmitting station through the reception fiber and selectively decouples the return fiber from the transmitting station. A switch controller, operationally coupled to the optical switch, causes the optical switch to optically couple the return fiber to the reception fiber.

1 Claim, 3 Drawing Sheets

ACTIVE OPTICAL LOOP-BACK SYSTEM

BACKGROUND OF THE INVENTION

1. Field of the Invention

This invention relates to optical communication systems. More particularly, this invention relates to a method and apparatus for looping-back an optical signal used in optical communications.

2. The Prior Art

Continuity of optical fiber transmission lines is often tested using an Optical Time Domain Reflectometer (OTDR), which sends an optical signal into an optical fiber and then senses any reflections off of discontinuities, such as breaks, returning on the optical fiber to the OTDR. Use of an OTDR interrupts the normal transmission of data and does not allow for diagnostic analysis of other aspects of an optical network during the OTDR tests. Furthermore, OTDRs are expensive pieces of test equipment. Therefore, cost limitations prevent the simultaneous use of OTDRs on many different transmission lines of an optical network. Furthermore, OTDR detection of signal discontinuities may be difficult due to normal attenuation of the OTDR signal in the case of long transmission lines. OTDR's also have the disadvantage of not being able to perform several important functions, including: testing transmission line integrity; performing round trip performance analysis; injecting and detecting errors; and, testing higher communications layers.

Loop-back, in which a signal is sent down one optical fiber and returned on another optical fiber, is a less costly method of detecting discontinuities than using OTDR's. However, conventional loop-back systems require the entire transmission line be dedicated to the loop-back process during a discontinuity test or a performance test. Furthermore, loop-back tests are limited in range due to the fact that the test beam may be significantly attenuated due to the added optical path length introduced in the loop-back process.

Nowhere does the prior art disclose a method or apparatus for employing loop-back in a discontinuity test that allows continued use of the transmission line for the transmission of data and that uses normal data for the discontinuity test and that regenerates the test beam.

SUMMARY OF THE INVENTION

The above-noted disadvantages of the prior art are overcome by the present invention, which in one aspect is an apparatus for looping-back an optical signal in an optical communications system that includes a transmitting station and a receiving station optically coupled to the transmitting station by a transmission fiber and reception fiber. Data is transmitted from the transmitting station to the receiving station through the transmission fiber and is also transmitted from the receiving station to the transmitting station through the reception fiber. The apparatus includes a beam splitter having an input port, an output port and a tap port, operationally coupled to the transmission line. The beam splitter is capable of diverting a preselected beam portion of an optical data beam being transmitted through the transmission fiber to the tap port. A tap fiber that is operationally coupled to the tap port allows the preselected beam portion to propagate therethrough. An optical analyzer, optically coupled to the tap fiber, regenerates the preselected portion, thereby creating a return beam. A return fiber, optically coupled to the optical analyzer, transmits the return beam. An optical switch, optically coupled the to reception fiber and to the return fiber, selectively optically couples the return fiber to the transmitting station through the reception fiber and selectively decouples the return fiber from the transmitting station. A switch controller, operationally coupled to the optical switch, causes the optical switch to optically couple the return fiber to the reception fiber.

In another aspect, the invention is a method of generating a loop-back test on an optical communications channel, including a transmission fiber and a reception fiber. A signal from a transmitting station is transmitted into the transmission fiber. a portion of a signal transmitted through the transmission fiber is tapped from the transmission fiber, thereby creating a tapped signal. The tapped signal is regenerated with an optical analyzer, thereby generating a regenerated signal. The regenerated signal is introduced into the reception fiber and the regenerated signal is received at the transmitting station.

An advantage of the invention is that it allows loop-back tests to be performed with actual data. A further advantage of the invention is that it allows analysis of data being looped-back. A further advantage of the invention is that it allows loop-back tests to be performed with minimal additional hardware expenditure.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
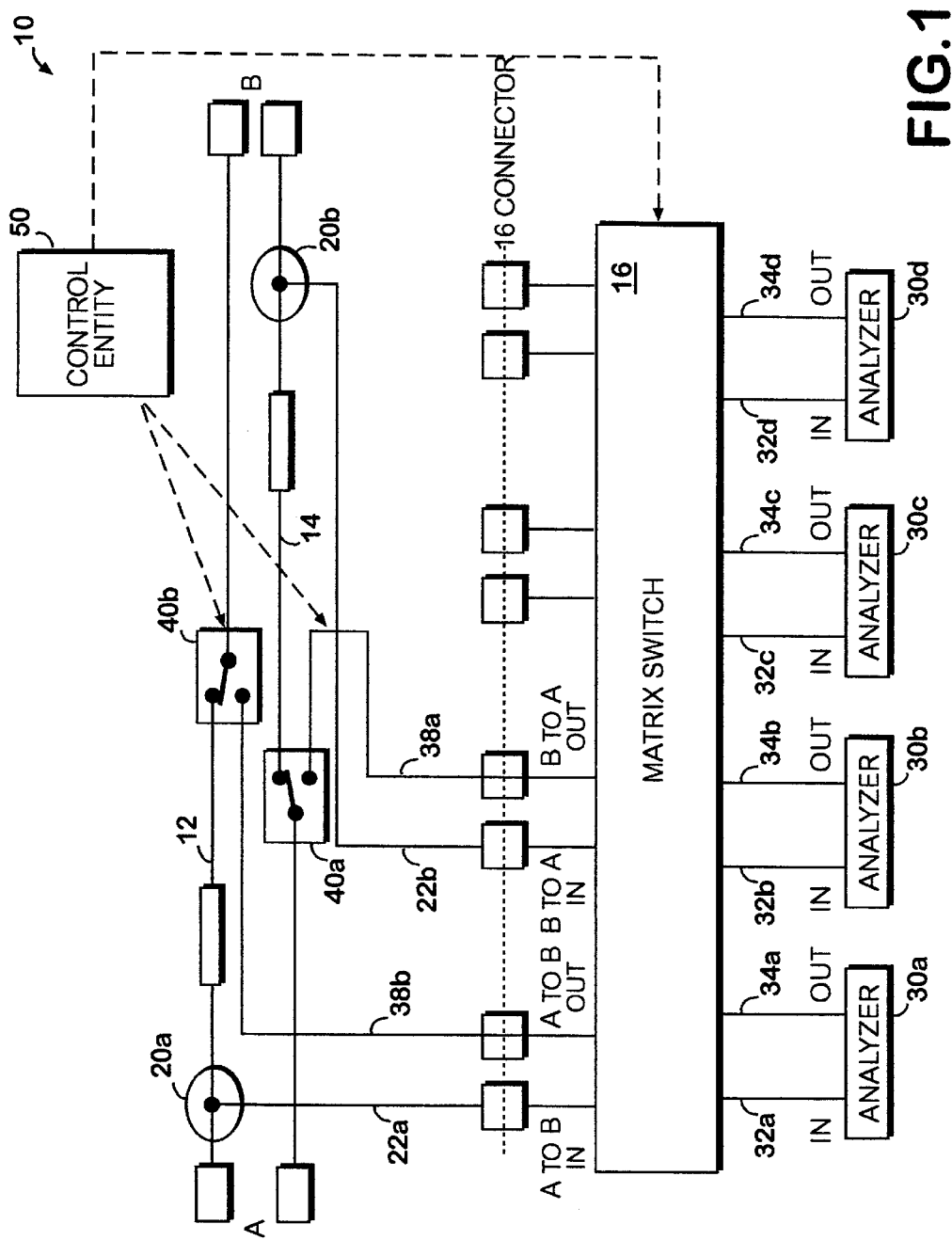
FIG. 1 is a schematic diagram of a first embodiment of the invention.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

As shown in FIG. 1, the invention allows generating loop-back tests on an optical communications system 10. Typically, such a system 10 allows communication between a transmitting station A and a receiving station B. Station A transmits data through a transmission fiber 12 (such as a 9 micron optical communications fiber) to station B and receives data from station B through a reception fiber 14. (As is obvious to those of skill in the art, the designation of stations A and B as the transmitting station and receiving station, respectively, is completely arbitrary.)

A beam coupler/splitter 20a diverts a portion (typically 10%) of the power of the beam being transmitted through the transmission fiber 12 to a tap fiber 22a. In one embodiment, the beam coupler/splitter 20a would be a low excess loss 90/10 coupler/splitter available from Gould Electronics Inc., Fiber Optics Div., 1121 Benfield Blvd., Millersville, Md. 21108-2540.

The tap fiber 22a transmits the beam portion to a matrix switch 16 that routs the beam portion from the tap fiber 22a to an analyzer 30a. The analyzer includes a reception port 32a, for receiving data from the matrix switch 16, and a transmission port 34a, for transferring data to the matrix switch 16. An example of a suitable matrix witch would comprise two DiCon V×500 separately controlled 1×N optical switches, available from DiCon Fiberoptics, Inc., 1331 Eighth Street, Berkeley, Calif. 94710.

Typically, a plurality of analyzers 30a–d will be coupled to the matrix switch 16, each receiving data from a respective reception port 32a–d and each transferring data through a respective transmission port 34a–d. By using separately controlled 1×N switches, the matrix switch is configurable so that a single analyzer may be coupled to both the transmission fiber 12 and the reception fiber 14, simultaneously. In one embodiment, the analyzer 30a would be a Broad Band Test System available from Adtech, Inc., 3465 Waialae Ave., Suite 200, Honolulu, Hi. 96816. Many other asynchronous transfer mode (ATM) analyzers may also be employed, including a Hewlett-Packard Model 75,000. Typically, the analyzer 30a will be coupled to matrix switch 16 through a reception port 34a, which receives data from the matrix switch 16, and a transmission port 34b, which transmits data to the matrix switch 16.

The analyzer 30a receives data signal tapped from the transmission fiber 12 via the beam coupler/splitter 20a, the tap fiber 22a and the matrix switch 16. The tapped signal received by the analyzer 30a has only about one-tenth of the power of the original data beam. Therefore, the analyzer 30a regenerates the signal to its original power and transmits it through the matrix switch 16 to a return fiber 38a. The signal is delivered by the return fiber 38a to a 1×2 optical switch 40a that is capable of selectively coupling data from the return fiber 38a into the reception fiber 14 for reception by the transmitting station A, which then determines the degree that loop-backed signal corresponds to the originally transmitted signal. The 1×2 optical switch may be a single mode switch (although multiple mode switches may be used with multimode fiber transmission) such as PN S-12-9-N-N, available from DiCon Fiberoptics, Inc.

Similarly, a loop-back test from the receiving station B may be conducted using the coupler/splitter 20b provided on the reception fiber 14 and the 1×2 optical switch 40b coupled to the transmission fiber 12 in the manner described above.

The 1×2 optical switches 40a–b and the matrix switch 16 are controlled by a control entity of the same type used in a GP700 General Purpose Fiberoptic Switch enclosure available from DiCon Fiberoptics, Inc. Other types of control entity may be employed, depending on the particular type of optical switches used.

Figure 2:
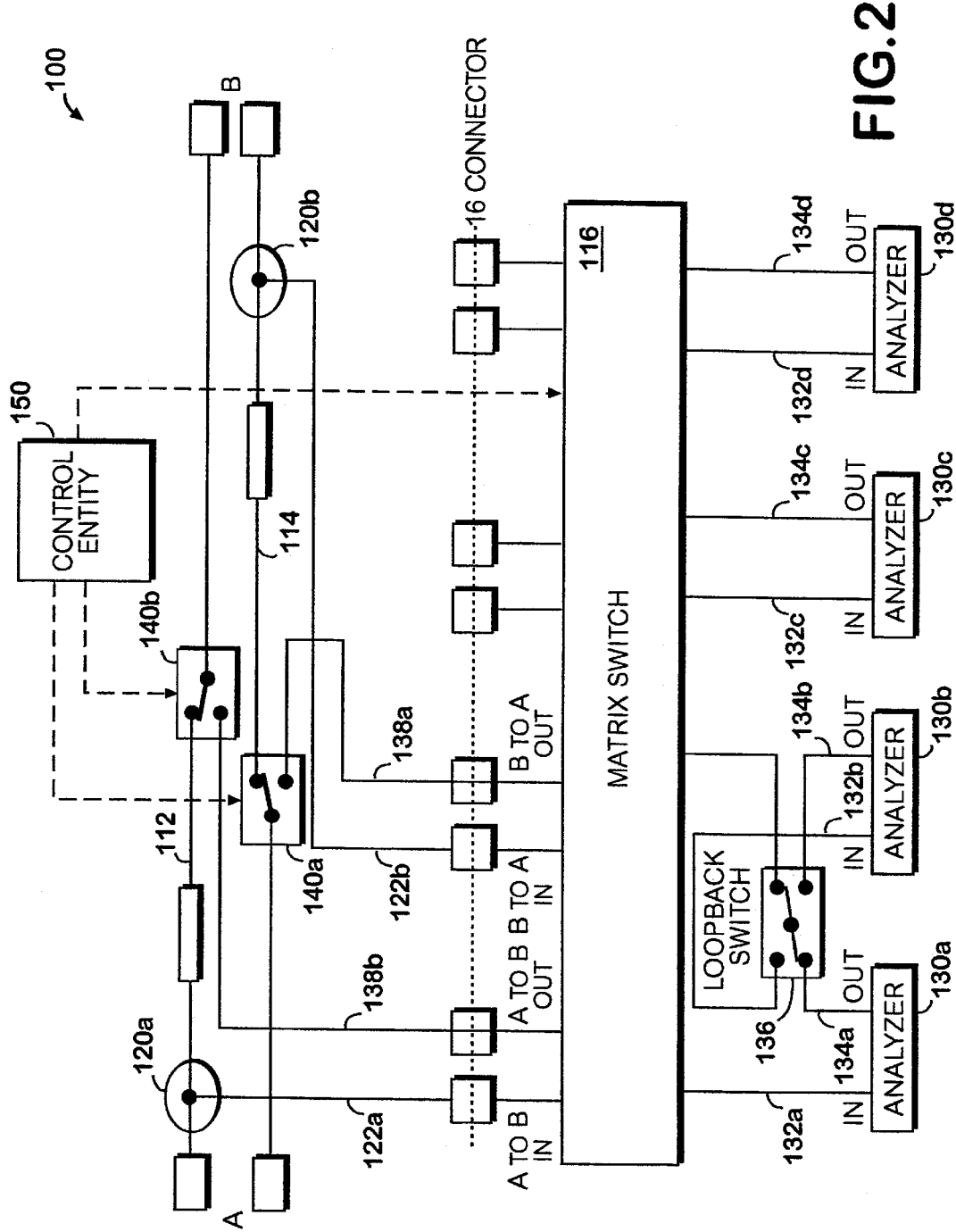
FIG. 2 is a schematic diagram of a second embodiment of the invention.

As shown in FIG. 2, in some network applications, the matrix switch 116 will comprise single duplex 1×N switches, so that the matrix switch 116 may be configured so that any given analyzer 130a–d may be coupled to only a transmission fiber 112 or a reception fiber 114 of a given communications channel, but not both simultaneously. To facilitate a loop-back test in this embodiment of the invention 100, an optical loop-back switch 136 is used to couple the transmission port 134a of the analyzer 130a configured to receive data from the transmission fiber 112 to the transmission port 134b of another analyzer 130b configured to transmit data to the reception fiber 114. This embodiment is controlled by a control entity 150 similar to the one disclosed in the discussion of FIG. 1.

Figure 3:
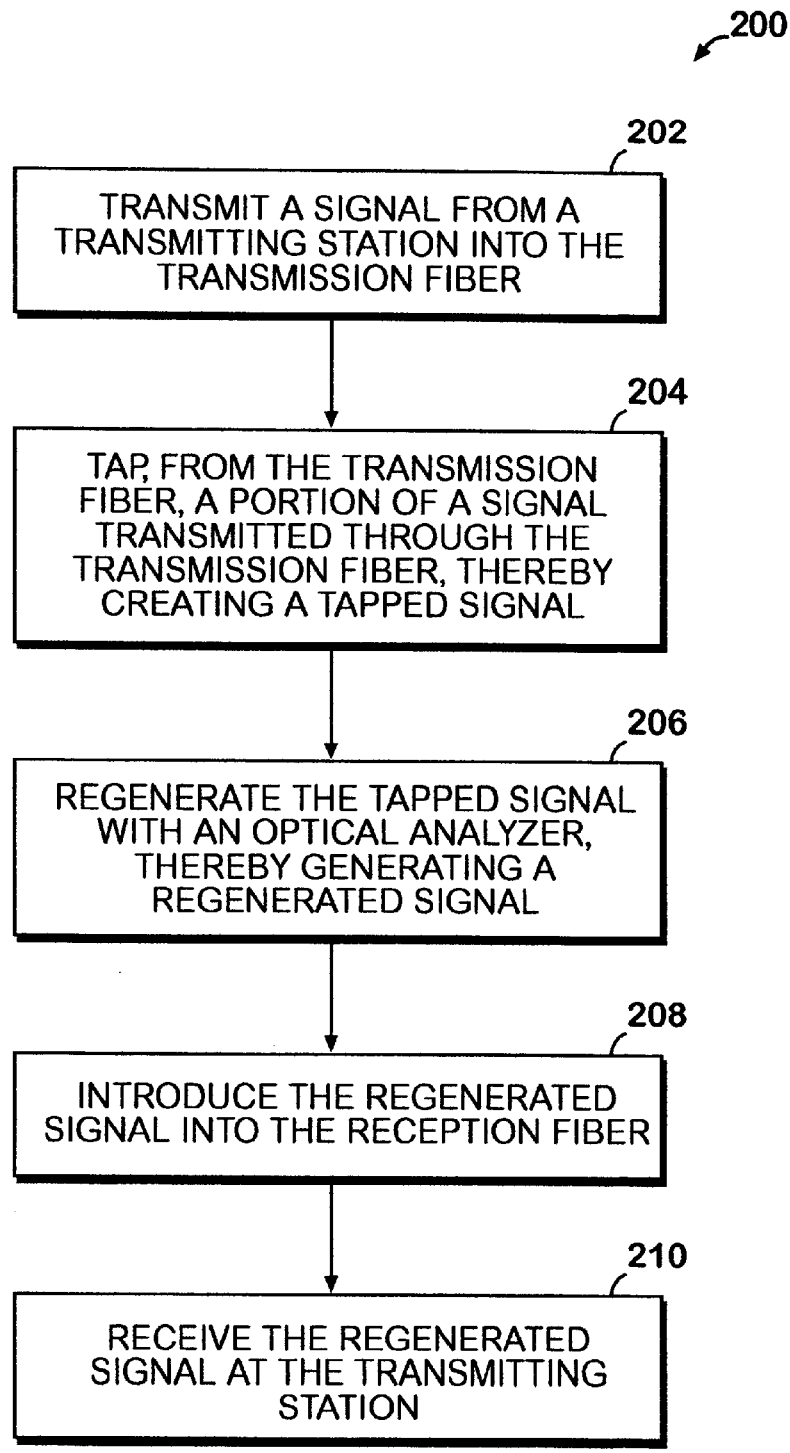
FIG. 3 is a flow chart showing the steps of the method employed in the invention.

As shown in FIG. 3, to execute the method of the invention 200 the system first transmits a signal from a transmitting station into the transmission fiber 202. A portion of a signal transmitted through the transmission fiber is tapped 204 from the transmission fiber, thereby creating a tapped signal. The tapped signal is regenerated 206 with an optical analyzer, thereby generating a regenerated signal. The regenerated signal is then introduced 208 into the reception fiber and is received 210 at the transmitting station.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An apparatus for looping-back an optical signal in an optical communications system, the optical communications system including a transmitting station and a receiving station optically coupled to the transmitting station by a transmission fiber and reception fiber, wherein data is transmitted from the transmitting station to the receiving station through the transmission fiber and wherein data is transmitted from the receiving station to the transmitting station through the reception fiber, the apparatus comprising:

a. a beam splitter having an input port, an output port and a tap port, operationally coupled to the transmission line, capable of diverting a preselected beam portion of an optical data beam being transmitted through the transmission fiber to the tap port;

b. a tap fiber, operationally coupled to the tap port, through which the preselected beam portion propagates;

c. an optical analyzer, optically coupled to the tap fiber, that regenerates the preselected portion, thereby creating a return beam;

d. a return fiber, optically coupled to the optical analyzer, through which the return beam is transmitted;

e. an optical switch, optically coupled the to reception fiber and to the return fiber, capable of selectively optically coupling the return fiber to the transmitting station through the reception fiber and capable of selectively decoupling the return fiber from the transmitting station; and f. a switch controller, operationally coupled to the optical switch, capable of causing the optical switch to optically couple the return fiber to the reception fiber.

* * * * *